United States Patent
Nilsson et al.

(10) Patent No.: US 8,135,224 B2
(45) Date of Patent: Mar. 13, 2012

(54) GENERATING IMAGE DATA

(75) Inventors: Michael E Nilsson, Ipswich (GB); David G Morrison, Felixstowe (GB)

(73) Assignee: BRITISH TELECOMMUNICATIONS public limited company, London (GB)

( * ) Notice: Subject to any disclaimer, the term of this patent is extended or adjusted under 35 U.S.C. 154(b) by 989 days.

(21) Appl. No.: 12/065,132

(22) PCT Filed: Aug. 16, 2006

(86) PCT No.: PCT/GB2006/003073
§ 371 (c)(1),
(2), (4) Date: Feb. 28, 2008

(87) PCT Pub. No.: WO2007/028943
PCT Pub. Date: Mar. 15, 2007

(65) Prior Publication Data
US 2008/0205793 A1    Aug. 28, 2008

(30) Foreign Application Priority Data
Sep. 6, 2005    (EP) ..................................... 05255448

(51) Int. Cl.
*G06K 9/36*    (2006.01)
(52) U.S. Cl. ...................................... 382/232
(58) Field of Classification Search .................. 382/166, 382/232, 238; 348/394.1, 405.1, 409.1, 411.1, 348/415.1, 424.1; 358/525, 539; 375/240.11, 375/240.12, 240.16, 240.21
See application file for complete search history.

(56) References Cited

U.S. PATENT DOCUMENTS 4,979,040 A * 12/1990 Masumoto ............... 375/240.21
5,018,010 A * 5/1991 Masumoto ............... 375/240.16
5,901,242 A * 5/1999 Crane et al. ................... 382/166
2004/0008780 A1    1/2004 Lai et al.

OTHER PUBLICATIONS

International Search Report for PCT/GB2006/003073 dated Sep. 22, 2006.
Tanskanen Jarno K et al.: "Scalable parallel memory architectures for video coding," Journal of VLSI Signal Processing Systems for Signal, Image, and Video Technology, Sep. 2004, vol. 38, No. 2, pp. 173-199, XP002374005.
Thomas Wedi: "Results on complexity and coding performance investigations: Displacement vector resolution and interpolation filter tap size," ITU-Telecommunications Standardization Sector Study Group 16 Question 6, Video Coding Experts Group, Austin, Texas, Apr. 2, 2001, pp. 1-8, XP002374006.
Zhou X et al.: "Implementation of H.264 decoder on general-purpose processors with media instructions," Proceedings of the SPIE, Virginia, vol. 5022, 2003, pp. 224-235, XP002367314.

* cited by examiner

*Primary Examiner* — Jose Couso
(74) *Attorney, Agent, or Firm* — Nixon & Vanderhye P.C.

(57) ABSTRACT

The present invention concerns the generation of image data, particularly, though not exclusively for motion estimation in the context of video coders employing inter frame differential coding. A method is provided for generating image data using a set of sampled pixels, the sampled pixels being representative of a sampled image, the method including the steps of: (i) at intermediate positions between sampled pixels, interpolating the sampled pixels so as to provide at least one set of interpolated pixels arranged along a plurality of lines, the or each set of interpolated pixels having a respective offset relative to the sampled pixels, and, (ii) storing the or each set of interpolated pixels with a respective address in a memory, the addresses forming an ordered sequence, wherein along a given line, neighbouring interpolated pixels having the same offset are stored with respective addresses that are consecutive to one another in the ordered sequence.

11 Claims, 5 Drawing Sheets

|  |  | i=1 | | | | i=2 | | | |
|---|---|---|---|---|---|---|---|---|---|
|  |  | 00 | 01 | 02 | 03 | 00 | 01 | 02 | 03 |
| j=1 | 00 | 1 | 2 | 3 | 4 | 5 | 6 | 7 | 8 |
|  | 01 | 9 | 10 | 11 | 12 | 13 | 14 | 15 | 16 |
|  | 02 | 17 | 18 | 19 | 20 | 21 | 22 | 23 | 24 |
|  | 03 | 25 | 26 | 27 | 28 | 29 | 30 | 31 | 32 |
| j=2 | 00 | 33 | 34 | 35 | 36 | 37 | 38 | 39 | 40 |
|  | 01 | 41 | 42 | 43 | 44 | 45 | 46 | 47 | 48 |
|  | 02 | 49 | 50 | 51 | 52 | 53 | 54 | 55 | 56 |
|  | 03 | 57 | 58 | 59 | 60 | 61 | 62 | 63 | 64 |

FIG. 5

|  |  | i=1 | | | | i=2 | | | |
|---|---|---|---|---|---|---|---|---|---|
|  |  | 0 | 1 | 2 | 3 | 0 | 1 | 2 | 3 |
| j=1 | 0 | 1 | 5 | 9 | 13 | 2 | 6 | 10 | 14 |
|  | 1 | 17 | 21 | 25 | 29 | 18 | 22 | 26 | 30 |
|  | 2 | 33 | 37 | 41 | 45 | 34 | 38 | 42 | 46 |
|  | 3 | 49 | 53 | 57 | 61 | 50 | 54 | 58 | 62 |
| j=2 | 0 | 3 | 7 | 11 | 15 | 4 | 8 | 12 | 16 |
|  | 1 | 19 | 23 | 27 | 31 | 20 | 24 | 28 | 32 |
|  | 2 | 35 | 39 | 43 | 47 | 36 | 40 | 44 | 48 |
|  | 3 | 51 | 55 | 59 | 63 | 52 | 56 | 60 | 64 |

FIG. 6

|  |  | i=1 | | | | i=2 | | | |
|---|---|---|---|---|---|---|---|---|---|
|  |  | 0 | 1 | 2 | 3 | 0 | 1 | 2 | 3 |
| j=1 | 0 | 1 | 3 | 5 | 7 | 2 | 4 | 6 | 8 |
|  | 1 | 9 | 11 | 13 | 15 | 10 | 12 | 14 | 16 |
|  | 2 | 17 | 19 | 21 | 23 | 18 | 20 | 22 | 24 |
|  | 3 | 25 | 27 | 29 | 31 | 26 | 28 | 30 | 32 |
| j=2 | 0 | 33 | 35 | 37 | 39 | 34 | 36 | 38 | 40 |
|  | 1 | 41 | 43 | 45 | 47 | 42 | 44 | 46 | 48 |
|  | 2 | 49 | 51 | 53 | 55 | 50 | 52 | 54 | 56 |
|  | 3 | 57 | 59 | 61 | 63 | 58 | 60 | 62 | 64 |

FIG. 7

|  |  | i=1 | | | | i=2 | | | |
|---|---|---|---|---|---|---|---|---|---|
|  |  | 0 | 1 | 2 | 3 | 0 | 1 | 2 | 3 |
| j=1 | 0 | 1 | 5 | 7 | 9 | 2 | 6 | 8 | 10 |
|  | 1 | 11 | 13 | 15 | 17 | 12 | 14 | 16 | 18 |
|  | 2 | 19 | 21 | 23 | 25 | 20 | 22 | 24 | 26 |
|  | 3 | 27 | 29 | 31 | 33 | 28 | 30 | 32 | 34 |
| j=2 | 0 | 3 | 35 | 37 | 39 | 4 | 36 | 38 | 40 |
|  | 1 | 41 | 43 | 45 | 47 | 42 | 44 | 46 | 48 |
|  | 2 | 49 | 51 | 53 | 55 | 50 | 52 | 54 | 56 |
|  | 3 | 57 | 59 | 61 | 63 | 58 | 60 | 62 | 64 |

FIG. 8

|  |  | i=1 | | | | i=2 | | | |
|---|---|---|---|---|---|---|---|---|---|
|  |  | 0 | 1 | 2 | 3 | 0 | 1 | 2 | 3 |
| j=1 | 0 | 1 | 17 | 5 | 19 | 2 | 18 | 6 | 20 |
|  | 1 | 21 | 23 | 25 | 27 | 22 | 24 | 26 | 28 |
|  | 2 | 7 | 29 | 9 | 31 | 8 | 30 | 10 | 32 |
|  | 3 | 33 | 35 | 37 | 39 | 34 | 36 | 38 | 40 |
| j=2 | 0 | 3 | 41 | 11 | 43 | 4 | 42 | 12 | 44 |
|  | 1 | 45 | 47 | 49 | 51 | 46 | 48 | 50 | 52 |
|  | 2 | 13 | 53 | 15 | 55 | 14 | 54 | 16 | 56 |
|  | 3 | 57 | 59 | 61 | 63 | 58 | 60 | 12 | 64 |

GENERATING IMAGE DATA

This application is the U.S. national phase of International Application No. PCT/GB2006/003073 filed 16 Aug. 2006 which designated the U.S. and claims priority to European Application No. 05255448.2 filed 6 Sep. 2005, the entire contents of each of which are hereby incorporated by reference.

BACKGROUND AND SUMMARY

The present invention concerns the generation of image data, particularly, though not exclusively for motion estimation in the context of video coders employing inter-frame differential coding.

Figure 1:
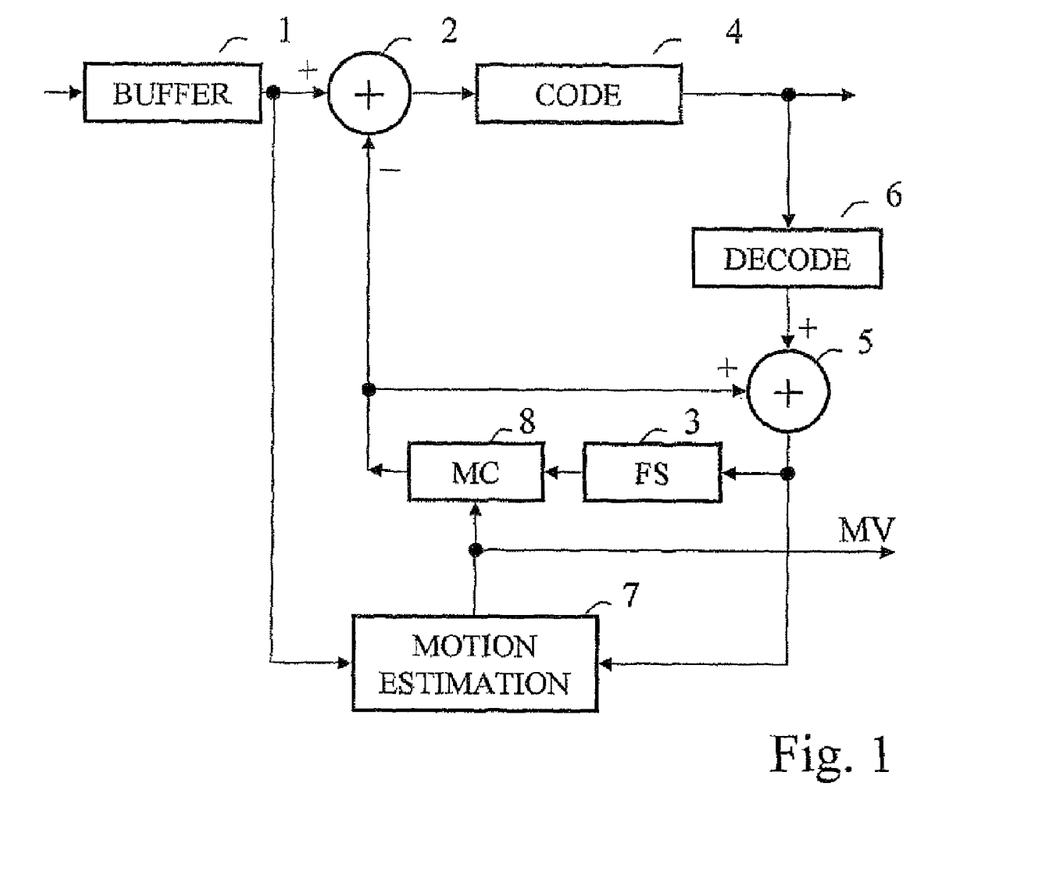
FIG. 1 is a block diagram of a known form of video coder.

FIG. 1 shows a known form of video coder. Video signals (commonly in digital form) are received by an input buffer 1. A subtractor 2 forms the difference between the input and a predicted signal from a frame store 3 which is then further coded in box 4. The coding performed here is not material to the present invention, but may include thresholding (to suppress transmission of zero or minor differences) quantisation or transform coding for example. The input to the frame store is the sum, formed in an adder 5, of the prediction and the coded difference signal decoded in a local decoder 6 (so that loss of information in the coding and decoding process is included in the predictor loop).

The differential coding is essentially inter-frame, and the prediction could simply consist of a one-frame delay provided by the frame store 3; as shown however a motion estimator 7 is also included. This compares the frame of the picture being coded (also referred to herein as the reference frame) with the previous frame (also referred to herein as the target frame) being supplied to the predictor. For each block of the current frame, into which the picture is regarded as divided, the motion estimator identifies that region of the previous frame which the block most closely resembles. The vector difference in position between the identified region and the block in question is termed a motion vector (since it usually represents motion of an object within the scene depicted by the television picture) and is applied to a motion compensation unit 8 which serves to shift the identified region of the previous frame into the position of the relevant block in the current frame, thereby producing a better prediction. This results in the differences formed by the subtractor 2 being, on average, smaller and permits the coder 4 to encode the picture using a lower bit rate than would otherwise be the case.

The motion estimator must typically compare each block with the corresponding block of the previous frame and regions positionally shifted from that block position; in practical systems this search is limited to a defined search area rather than being conducted over the entire frame, but even so it involves a considerable amount of processing and often necessitates many accesses to stored versions of both frames. Note that this requires that the input buffer 1 introduces sufficient delay that the motion estimator 7 has access to the current block and its search area to complete its motion estimation for that block before it arrives at the subtractor 2.

Figure 2:
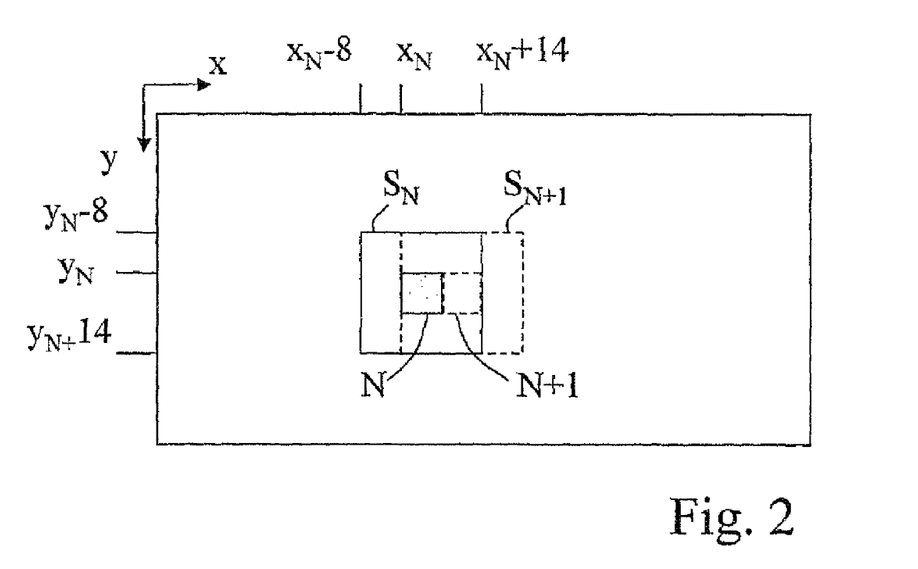
FIG. 2 is a diagram of a television picture showing a co-ordinate system and a search area used by the motion estimators of FIG. 1.

Usually the motion estimator regards a "current" frame of a television picture which is being coded as being divided into 8×8 blocks—that is, eight picture elements (pixels) horizontally by eight lines vertically. Although the principles are equally applicable to interlaced systems, for simplicity of description a non-interlaced picture is assumed. It is designed to generate for each block a motion vector which indicates the position of the 8×8 region, lying within a defined search area of the (or a) previous frame of the picture, which is most similar to the block in question (alternatively, a motion vector may be associated with a 16×16 macro block). FIG. 2 illustrates a field with an 8×8 block N (shaded) and a typical associated 23×23 search area indicated by a rectangle $S_N$. If the pixels horizontally and lines vertically are identified by co-ordinates x, y, with an origin at the top left-hand corner, then the search area for a block whose upper left hand corner pixel has co-ordinates $x_N, y_N$ is the area extending horizontally from $(x_N-8)$ to $(x_N+14)$ and vertically from $(y_N-8)$ to $(y_N+14)$.

In order to obtain the motion vector it is normal to conduct a search in which the block is compared with each of the 256 possible 8×8 regions of the previous frame lying within the search area—i.e. those whose upper left pixel has co-ordinates $x_N+u, y_N+v$ where u and v are in the range −8 to +7. The motion vector is the values of u,v for which the comparison indicates the greatest similarity. The test for similarity can be any conventionally used—e.g. the sum of the absolute values of the differences between each of the pixels in the "current" block and the relevant region of the previous frame.

Many video compression algorithms support motion vectors to fractional pixel accuracy. For example, MPEG-1 (IS 11172-2), MPEG-2 (IS 13828-2), H.263 and MPEG-4 (IS 14496-2) allow motion vectors to half pixel accuracy. H.264 (also known as IS 14496-10 and Advanced Video Coding (AVC)) allows motion vectors to quarter pixel accuracy.

Fractional pixel motion vectors are usually computed in a two step process. In the first step, integer motion vectors only are considered, and the best motion vector is computed. In the second step, fractional pixel motion vectors around the best integer motion vector are considered and the best is computed.

In standard compression algorithms that support motion vectors to half pixel accuracy, the values of the pixels at half unit offsets are calculated by simple averaging of neighbouring pixel values. Fast half pixel motion searching techniques are known where the values of pixels at half unit offsets around the best integer motion vector are calculated "on the fly" and are used when calculating SOADs (Sum Of Absolute Differences) for the eight half pixel offset positions, (0.5, 0), (0.5, −0.5), (0, −0.5), (−0.5, −0.5), (−0.5, 0), (−0.5, 0.5), (0, 0.5), (0.5, 0.5).

In H.264, which allows motion vectors to quarter pixel accuracy, the values of the pixels at half unit offsets are calculated by applying a six tap filter to neighbouring pixel values, and the values of the pixels at quarter unit offsets are calculated by simple averaging of neighbouring pixel and half-pixel values. In this case, fast fractional pixel motion searching can not easily calculate the values of pixels at fractional pixel offset positions on the fly because of the number of pixel values that need to be calculated. It is more efficient in terms of processing power to calculate values of pixels at fractional pixel offset positions preferably once and then store them for later motion searching. That is, the values for the fractional pixels are calculated and stored in a first step, and in a subsequent step, the similarity tests are performed.

The storage of the values of pixels at fractional pixel offset positions becomes even more beneficial as more previous pictures are considered for motion compensation. H.264 allows up to 16 previous pictures to be used. H.263 Annex U allows multiple previous pictures, and so despite allowing only motion vectors to half pixel accuracy, there is benefit in storing the values of pixels at fractional pixel offset positions rather than calculating them "on the fly".

The stored pixels (integer and fractional) will each have a respective address which can be used to selectively retrieve a pixel from the memory. The addresses, each of which is normally formed by a binary word, can be viewed as a one-dimensional ordered sequence (the position of an address along the one-dimensional sequence need not be related to the physical position of the corresponding memory location).

The fractional (interpolated) pixels are normally stored together with the integer (sampled) pixels so as to form a single up-sampled image, the up-sampled image having a resolution corresponding to the separation between the fractional pixels. In terms of the addressing arrangement, the address of pixels are incremented in a raster like fashion, with neighbouring pixels (integer and fractional) along a line having consecutive addresses. This may be considered desirable in many situations, since reading the addresses in order will produce a raster signal of image at the up-sampled resolution. However, it has been appreciated by the present inventors that for some applications, such as motion searching, such prior art addressing arrangements can be inconvenient.

According to the present invention there is provided a method of generating image data using a set of sampled pixels arranged along a plurality of lines, the method including the steps of: (i) at intermediate positions between sampled pixels, interpolating the sampled pixels so as to provide at least one set of interpolated pixels, the or each set of interpolated pixels having a respective offset relative to the set of sampled pixels, and, (ii) storing the or each set of interpolated pixels with a respective address in a memory, the addresses forming an ordered sequence, wherein along a given line, consecutive interpolated pixels having the same offset are stored with respective addresses that are consecutive to one another in the ordered sequence.

Because at least along a given line, pixels with the same offset are stored with consecutive addresses in the ordered sequence, the retrieval and manipulation of such pixels will be easier than it would be in situations where the sampled and interpolated pixels are simply stored in the order in which they are positioned along the line.

Preferably, the pixels are interpolated at least at a half unit offset and a quarter unit offset from sampled pixels (the unit being determined by the spacing of the sampled pixels). By providing interpolations at half unit and quarter unit offsets, the image will effectively be up-sampled, allowing the processing of the image, for example through the calculation of motion vectors to be carried out more accurately than with the sampled pixels alone. However, the interpolation may be carried out to provide yet further accuracy, for example with offsets of ⅛ of a unit or smaller.

The respective addresses of interpolated pixels originating from a plurality of lines but having a common offset may be grouped together in the ordered sequence. For a given offset position, the pixels from each of the lines may be grouped in this way, with the result that the ordered sequence includes a plurality of portions which follow-on from one another, each portion being representative of a raster-scan of the image notionally sampled (or actually sampled in the case of sampled pixels) at a respective offset position.

However, pixels (interpolated and sampled) need not be grouped solely according to their offset position. The respective addresses of interpolated pixels on a given line may be grouped together in the ordered sequence. That is, for a given line, pixels from that line may be grouped, pixels from a line-group being further divided into sub-groups, each sub-group corresponding to a given offset position.

The pixels may be grouped according to both offset position and the line in which they occur. Thus, pixels with at least one first common offset position (or the sampled pixels) at different lines may be grouped together, and the remaining pixels may be grouped on a line-by-line basis (for each line, pixels with the same offsets being themselves grouped).

In a first embodiment, pixels with a given offset on each line are stored together; that is, for a given offset, each line of the image is incremented when generating the ordered sequence until each pixel with the given offset is stored, following which the lines are again incremented for the next offset position. In a second embodiment, for a given line, the offset position is incremented: once all the offset positions of a given line have been stored, pixels values on the next line are stored. In a third embodiment, the sampled pixels are stored together as in the first embodiment, the remaining (interpolated) pixels being stored as in the second embodiment. In a fourth embodiment, first the sampled pixels are stored, followed by pixels interpolated at a ½ unit offset, followed by pixels sampled at ¼ unit offset (in each of these embodiments, the order may be reversed).

The stored data will preferably be used to generate a motion vector in respect of a reference frame relative to a target frame, the target frame being formed at least in part by image data stored as described above. Preferably, the generation of the motion vector will include the further steps of: selecting an image portion in the reference frame; and, comparing the selected portion with one or more portions of corresponding size in the target frame.

BRIEF DESCRIPTION OF THE DRAWINGS

Other aspects of the invention are defined in the claims. Embodiments of the invention will now be described, by way of example, with reference to the accompanying drawings, in which:

DETAILED DESCRIPTION OF PRESENT EXAMPLE EMBODIMENTS

The video coder now to be described has the same structure as shown in FIG. 1. The motion compensation unit 8 receives ¼ pixel resolution motion vectors from the motion estimator 7 and interpolates, from pixel data retrieved from the frame store 3, predicted pixel data pixel corresponding to the shift specified by the motion vector. The operation of the coder is conventional except for the motion estimator 7 and the storage arrangement for storing data in the store, each of which will be described below.

Figure 3:
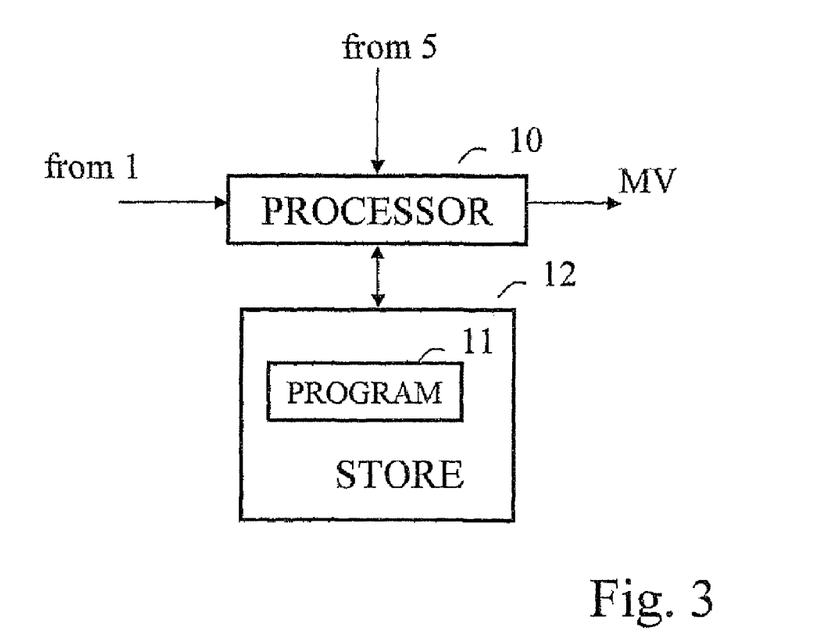
FIG. 3 is a block diagram of a motion estimator as used in one embodiment of the present invention.

As shown in FIG. 3, the function of the motion estimator is performed by a processor 10, controlled by a program 11 stored in memory 12. In a first step the processor retrieves a frame formed from integer pixels from the frame store, and interpolates the integer pixels so as to generate interpolated pixels using a known technique. The interpolated and integer pixels are stored in the frame store according to one of the arrangements described below. In a subsequent step, the processor uses the stored interpolated and integer pixels to generate a motion vector.

A simple processor may be used that has no internal memory or cache, but that retrieves data directly from an external memory, here the frame store 3. That is, the processor is on a first chip, and is connected with an address bus and a data bus to the memory which is external to the processor, on a second chip. The speed at which data can be loaded from the external memory into the processor is normally determined by the data bus width (8, 16, 32 . . . bits) and the clock speed of the bus.

However, a more complex processor chip is preferably used that has an internal memory as well as a processor. This memory will have better connectivity to the processor, because it is internal. The internal memory may be used for frequently accessed data and the external for other data. The internal memory is referred to herein as the cache, and its contents are managed by the processor. It becomes a duplicate of parts of the external memory, rather than being complementary to it. Normally, a programmer has little control over what is in the cache. The processor is configured to actively manage the contents of the cache, trying to keep recently accessed data in it. So it is better to instruct the processor to perform lots of operations on the same data, before moving on to the next data, rather than performing the same one operation on lots of different data and then performing a different second operation to all of the data. In some situations when the processor is required to access to a small amount of data, for example just a byte or two, and this is not in the cache, then this data and neighbouring data may be loaded into the cache by the processor, in expectation that it may be beneficial to have it there.

Some processors, such as Pentiums, have more than one cache: a level one cache which is quite small but very fast, and a level two cache which is bigger but slower (but still faster than external memory). The level one cache effectively works as a cache for the level two cache. It can therefore be desirable to perform the motion estimation process so that the referenced data is in the cache, rather than having to be loaded from external memory. The chance of this occurring is increased by organising the order in which the data is stored such that the processor can use the same and neighbouring data as much as possible before moving on to access more distant data.

The invention can best be understood by first considering a prior art storage arrangement for storing the pixels in the frame store 3. The following is described in terms of the calculation of quarter pixel motion vectors, but is not limited to this, and is applicable to the calculation of other sub-pixel accuracy motion vectors. In the terminology below: the original pixel values in the integer motion vector previous picture are denoted by $R_{00}(i,j)$; the horizontal-only interpolated pixel values (to the right of $R_{00}(i,j)$) are denoted by $R_{10}(i,j)$, $R_{20}(i,j)$, $R_{30}(i,j)$; the vertical-only interpolated values (below $R_{00}(i,j)$) are denoted by $R_{01}(i,j)$, $R_{02}(i,j)$, $R_{03}(i,j)$; and, the other interpolated pixel values are denoted by $R_{11}(i,j)$, $R_{12}(i,j)$, . . . $R_{32}(i,j)$, $R_{33}(i,j)$.

In prior art storage arrangements, the interpolated pixels are stored as an up-sampled version of the integer motion vector previous picture $R_{00}(i,j)$, as follows.

---
for all j{for all i{$R_{00}(i,j)$, $R_{10}(i,j)$, $R_{20}(i,j)$, $R_{30}(i,j)$}, for all i {$R_{01}(i,j)$, $R_{11}(i,j)$, $R_{21}(i,j)$, $R_{31}(i,j)$}, for all i{$R_{02}(i,j)$, $R_{12}(i,j)$, $R_{22}(i,j)$, $R_{32}(i,j)$}, for all i{$R_{03}(i,j)$, $R_{13}(i,j)$, $R_{23}(i,j)$, $R_{33}(i,j)$}}

---

The expression above indicates the order in which the address of each pixel (integer and fractional) is incremented. Thus, the order is $R_{00}(0,0)$, $R_{10}(0,0)$, $R_{20}(0,0)$, $R_{30}(0,0)$, $R_{00}(1,0)$, $R_{10}(1,0)$, $R_{20}(1,0)$, $R_{30}(1,0)$, $R_{00}(2,0)$, $R_{10}(2,0)$, $R_{20}(2,0)$, $R_{30}(2,0)$ etc. . . . This is illustrated graphically in FIG. 4. Here, pixels are delineated by horizontal and vertical grid lines. Only a small frame is shown for clarity, having two integer pixels in each direction, the integer pixels being indicated as shaded rectangles. Between each integer pixel is provided three fractional pixels, corresponding to a ¼ pixel resolution. Each pixel is numbered according to its position in the address sequence. Thus, in the prior art, the order of the pixels when scanned in the manner of a raster matches their order in the address sequence.

In a first embodiment of the invention, instead of storing the previous image as a single image at the increased resolution provided by the up-sampling, the previous image is stored as a plurality of images, each with the original resolution of the previous image (i.e., as obtained without up-sampling). One image is stored for each fractional offset position $R_{i,j}$ with i,j 0, 1, 2, 3 for ¼ pixel accuracy. The original image is also stored. In general, where the fractional accuracy is 1/n, there will be n×n images stored, including the original image. Following the notation above, this can be represented as ---
for all j { for all i { $R_{00}(i,j)$ } }
for all j { for all i { $R_{10}(i,j)$ } }
for all j { for all i { $R_{20}(i,j)$ } }
for all j { for all i { $R_{30}(i,j)$ } }
for all j { for all i { $R_{01}(i,j)$ } }
for all j { for all i { $R_{11}(i,j)$ } }
for all j { for all i { $R_{21}(i,j)$ } }
for all j { for all i { $R_{31}(i,j)$ } }
for all j { for all i { $R_{02}(i,j)$ } }
for all j { for all i { $R_{12}(i,j)$ } }
for all j { for all i { $R_{22}(i,j)$ } }
for all j { for all i { $R_{32}(i,j)$ } }
for all j { for all i { $R_{03}(i,j)$ } }
for all j { for all i { $R_{13}(i,j)$ } }
for all j { for all i { $R_{23}(i,j)$ } }
for all j { for all i { $R_{33}(i,j)$ } }

---

Figure 4:
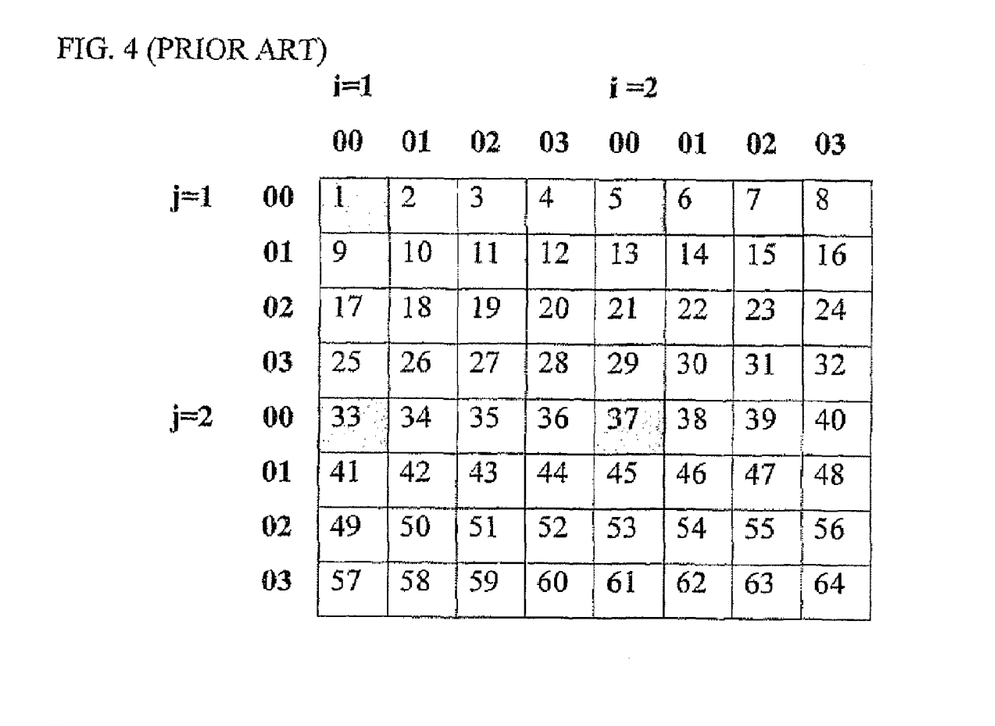
FIG. 4 is a representation of a prior art storage arrangement.
Figure 5:
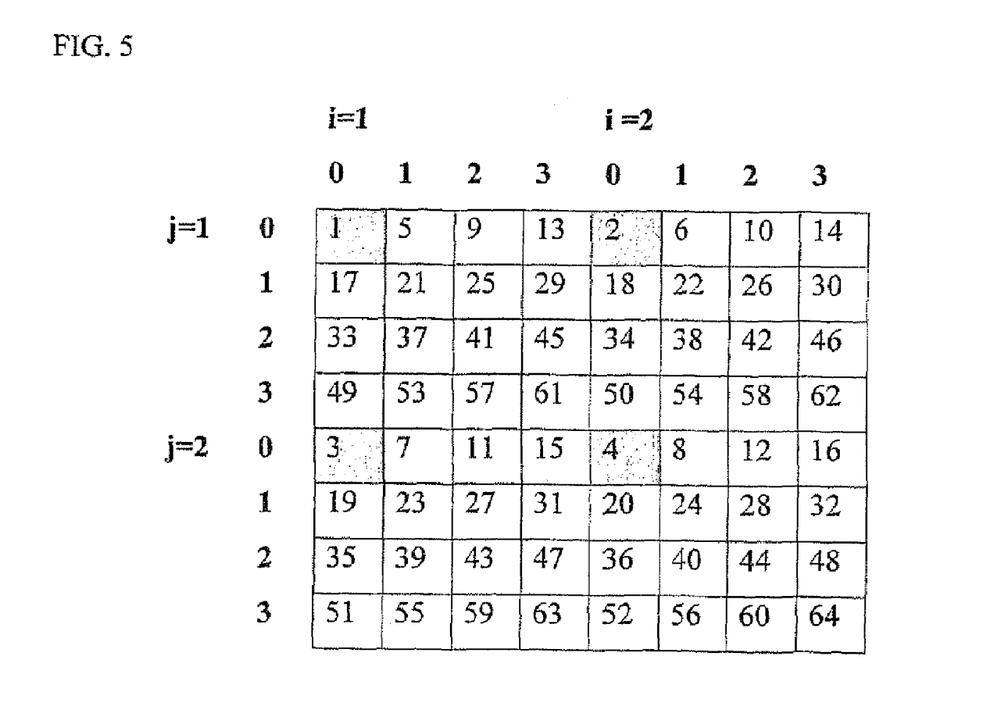
FIG. 5 is a representation of a first example of a storage arrangement according to the present invention

This is represented in FIG. 5, from which it can be seen that rather than being stored in the order in which they are positioned along a row, the pixels are stored at intervals, which intervals correspond to the original sampling separation. The result of this is that along a row, fractional pixels that are offset from consecutive integer pixels with the same fractional offset are stored consecutively. In the particular example of FIG. 4, reading the consecutive addresses would lead to a raster-scan signal which would generate, in a sequential fashion, first the original sampled image, followed by the image formed by interpolation at the offset position 1,0 in turn followed by the image formed by interpolation at the offset position 2,0 etc.

Typically, a memory is composed of eight bit bytes, each with its own address. In the above examples, the pixels are stored as one byte variables. However, pixels can be stored as a variable of a different size. For example, 10 and 12 bit pixels can be used. In such cases, two bytes will be needed for each interpolated pixel. In practice, in many programming languages, if there is a pointer to a two byte variable that is incremented, the actual value of the pointer will increase by two, so that the pointer addresses the next two byte variable. In such a situation, the consecutive addresses retrieved may be viewed as the incremented pointer values.

Some of the benefits of this storage arrangement can be most clearly understood with reference to the motion estimator. Returning to FIG. 3, the processor has access to "previous frame" pixels stored in the frame store 3 according to the arrangement of FIG. 5. The processor also has access to pixels of the current frame that is being coded, stored in the buffer 1. Its task is to generate a motion vector for each 8×8 block of the current frame (the algorithm can easily be adapted for other block sizes). To achieve this, the processor receives pixel luminance values Y for one 8×8 block of the current picture from the buffer 1. Subsequently, it computes a goodness of match measure which indicates how well the pixels Y of the 8×8 block under consideration are approximated by the sampled pixels $R_{00}$ of an 8×8 region offset by (u,v) from the corresponding position in the previous frame. One example of a suitable measure (other measures may be used instead) is the sum of absolute differences (SOAD), that is, $$E_{00}(u, v) = \sum_{l=0}^{7} \sum_{m=0}^{7} |Y(x_N + 1, y_N + m) - R_{00}(x_N + u + 1, y_N + v + m)| \quad (1)$$

where $x_N, y_N$ are the co-ordinates of the upper left-hand corner of the block. From the (integer) offset which provides the lowest SOAD value, an integer motion vector can be obtained which provides an initial estimate. An improved estimate with fractional pixel accuracy can then be obtained by calculating SOAD values with 8×8 region offset by fractional values of (u,v): that is, by calculating values for $E_{i,j}$ where i,j=0, 1, 2, 3, and $E_{i,j}$ is given by $$E_{i,j}(u, v) = \sum_{i=0}^{7} \sum_{m=0}^{7} |Y(x_N + 1, y_N + m) - R_{i,j}(x_N + u + 1, y_N + v + m)| \quad (2)$$

The SOAD for an 8×8 region is calculated by conceptually dividing the 8×8 block into a plurality of sub-blocks, here 8 sub-blocks which are each formed by a respective 8-pixel line of the 8×8 block. The SOAD for each line is individually calculated and then the individual SOAD results for each line are used to calculate the total SOAD result for the 8×8 block.

To calculate the SOAD for an individual line in the previous frame, the pixels of that line must be retrieved by the processor from the store. The processor is preferably of the "Pentium" type (manufactured by Intel), since such a processor is configured to receive a block instruction, in this example a Packed Sum of Absolute Differences (PSADBW), which is a subgroup of Streaming SIMD Extension (SSE) instructions supported on Pentium processors, as discussed at: http://www.tommesani.com/SSEPrimer.html. (Other processors which perform similar operations in response to block instructions may be used, such as those manufactured by AMD and VIA)

In response to an PSADBW instruction, the processor will retrieve data from a specified number of consecutive addresses, in this case the 8 addresses of a line from the 8×8 block. Thus, if the processor is to load a 64 bit portion of data, it will issue an instruction with an address of a first byte, and the addresses of the other seven bytes will be implicitly the next seven bytes in address sequence. Therefore, if the address of the first byte is 1000, the 64 bits will be loaded with the byte values of bytes stored at addresses 1000, 1001, . . . 1007 (in some architectures the addresses go downwards from the initial one, 1000, 999, . . . 993, but the principle is the same).

Once the data from the 8 consecutive addresses is retrieved, the PSADBW instruction causes the processor to perform a SOAD function on the respective pixels of the retrieved line. Although in the present example reference is made to a Pentium processor, another processor type may be used which is configured, in response to an instruction, to: retrieve data stored with consecutive addresses; and, perform a predetermined comparison function on the retrieved data in relation to reference data.

Because in the arrangement of FIG. 5 the previous frame is stored such that, along a given line, consecutive pixels in the image with the same fractional vector shift are stored with consecutive or at least neighbouring addresses, the PSADBW instruction can conveniently retrieve the 8 pixels of a line in a block in one step, since these will have consecutive addresses. Even if the fractional pixels along only part of a line are arranged consecutively in address space, this will still provided some benefit, although at points where the addresses are not consecutive, an alternative to the PSADBW instruction may need to be used.

A further benefit of this storage arrangement is that the integer motion vector previous picture is stored conventionally, thus allowing good use of the cache when performing integer motion vector calculation.

Without the use of a block instruction, it would be necessary to perform the difference operation (corresponding to the "Y-$R_{i,j}$" term of Eqn. 2) and the absolute calculation sequentially for each of the 64 pixels of the 8×8 block. That is, it would be necessary to perform the difference and absolute calculations on one pixel before retrieving the next pixel. This would normally require a separate instruction for each pixel. Furthermore, without the use of a block instruction, there is typically no instruction to perform an absolute operation, so this must be achieved with a compare instruction. So, ignoring the need to load pixel data into registers from memory, with a prior art storage arrangement of FIG. 3, three operations are needed for each pixel (difference, compare, add to running total), making a total of 3*64=192 instructions for each 8×8 block.

However, with the appropriate storage arrangement such as that shown in FIG. 4, a block instruction can retrieve all the pixels of one line of an 8×8 block, and, in a subsequent step once the pixels have been retrieved, perform the necessary SOAD calculation. In particular, the PSADBW instruction allows the calculation to be done for eight pixels at the same time. The instruction takes two 64 bit input values, performs 8 independent difference and absolute value operations, and adds up the eight results, all in one instruction. So the number of instructions needed for an 8×8 block comes down to 8 PSADBW instructions plus 8 accumulations of the outputs from PSADBW, making a total of 16 instructions, which is a reduction over the number needed with the prior art storage arrangement of FIG. 4.

The block instruction need not retrieve in one step an entire line (64 bits) of an 8×8 block. Some benefit would be obtained with an instruction that receives a smaller quantity of data, such as 32 or, even 16 bits, provided that the instruction can retrieve data groups larger than the pixel data size, which is 8 bits. A further important aspect of the instruction is that it will cause the processor to perform the required arithmetic (difference and compare in this particular example) independently on a plurality of data groups each of which is larger than 8 bit pixel size (as opposed to doing say a difference of 64 bit integers, with implicit carry between the groups of 8 bits).

Other storage arrangements are also possible. In a second embodiment, the interpolated pixels of each fractional offset position are considered as a separate image the same resolution as $R_{00}(i,j)$ but are interleaved on a line by line basis as follows: (Another way to think about this arrangement is to start with the first embodiment which can be viewed as 16 separate images, and then, to make a new arrangement by taking one line from each of these images in turn, repeating for each of the lines. This is effective because the adjacency of pixels along a row is important for the SSE instruction, and this is maintained. The reason it is thought that this may be more effective than the first embodiment is that when searching for sub-pixel motion vectors around a best integer vector, various sub-pixel displacements are tested, and if the relevant pixel data is all located closely in address space, then it is more likely to be in the cache.)

```
for all j
{
    for all i { R_00(i,j) }
    for all i { R_10(i,j) }
    for all i { R_20(i,j) }
    for all i { R_30(i,j) }
    for all i { R_01(i,j) }
    for all i { R_11(i,j) }
    for all i { R_21(i,j) }
    for all i { R_31(i,j) }
    for all i { R_02(i,j) }
    for all i { R_12(i,j) }
    for all i { R_22(i,j) }
    for all i { R_32(i,j) }
    for all i { R_03(i,j) }
    for all i { R_13(i,j) }
    for all i { R_23(i,j) }
    for all i { R_33(i,j) }
}
```

Figure 6:
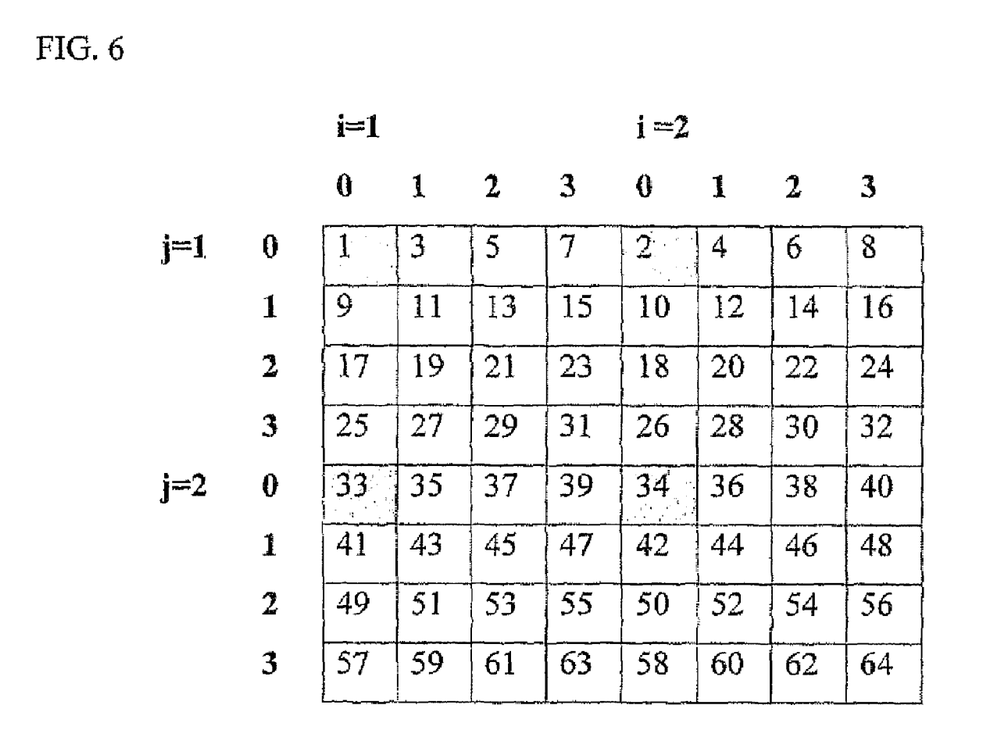
FIG. 6 is a representation of a second example of a storage arrangement according to the present invention

This is shown in FIG. 6. As in the first embodiment, pixels with the same fractional offset from sampled pixels are stored in the same order as they are positioned along a line or row. However, the offset pixels from a given line are grouped together. In the address sequence, first the sampled pixels of a given line are stored, then the 01 offset pixels from the line are stored, followed by the 02 offset pixels and subsequently each of the remaining offset positions for the line are stored. Once all the pixels from a given row have been stored, pixels from the next row are stored. Clearly, the offset pixel groups as a whole need not be stored in the order of their offset, so for a given row, the 02 pixels could be stored before the 01 pixels.

As for the first embodiment, one benefit of this arrangement is that when calculating SOADs for any of the sub-pixel offset positions, neighbouring previous pixels for that offset position are in neighbouring memory locations, thus allowing SOADs to be calculated using a block instruction. In addition, efficient use of the cache is achieved by the interleaving of lines of pixels representing different offset positions, as pixel values for the various sub-pixel displacements around an integer motion vector are stored in close proximity in memory.

Figure 7:
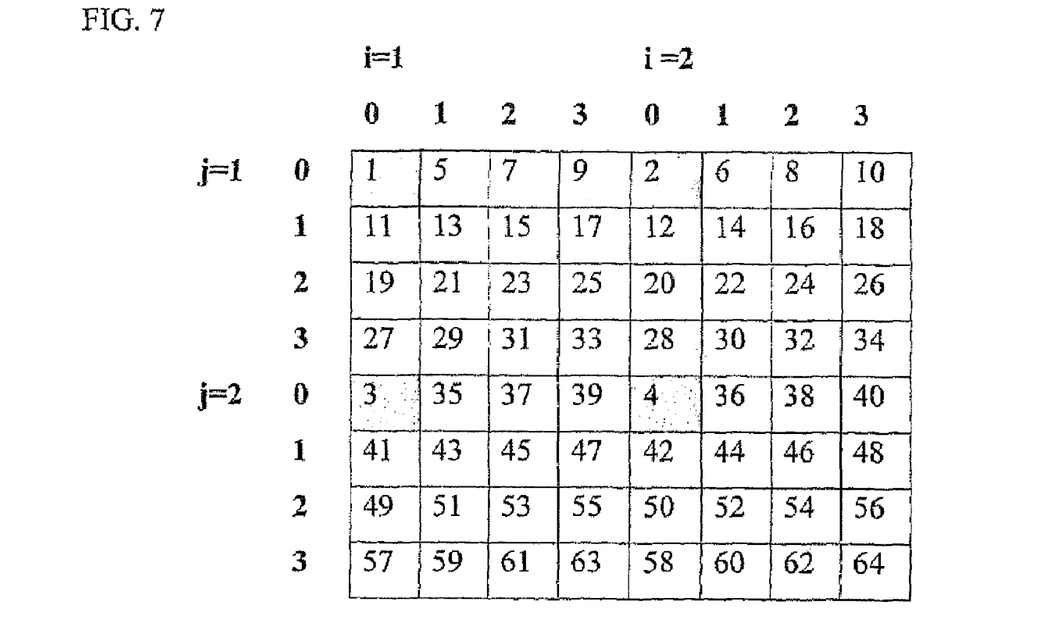
FIG. 7 is a representation of a third example of a storage arrangement according to the present invention.

In a third embodiment, the interpolated pixels are interleaved on a line by line basis, as in the second embodiment, but with the integer motion vector previous picture $R_{00}(i,j)$ stored separately. By separately, it is meant that the integer pixels are stored consecutively in the order expected of a raster-scan. The arrangement can be defined as follows:

```
for all j { for all i { R_00(i,j) } }
for all j
{
    for all i { R_10(i,j) }
    for all i { R_20(i,j) }
    for all i { R_30(i,j) }
    for all i { R_01(i,j) }
    for all i { R_11(i,j) }
    for all i { R_21(i,j) }
    for all i { R_31(i,j) }
    for all i { R_02(i,j) }
    for all i { R_12(i,j) }
    for all i { R_22(i,j) }
    for all i { R_32(i,j) }
    for all i { R_03(i,j) }
    for all i { R_13(i,j) }
    for all i { R_23(i,j) }
    for all i { R_33(i,j) }
}
```

This arrangement has the same benefits as the second embodiment, but as the integer motion vector previous picture is not used when performing the sub-pixel motion search, it does not need to be interleaved with the sub-pixel previous pictures. This has two benefits. Firstly, more efficient use of the processor cache can be made when performing integer motion search as only integer previous pixels are accessed. This will be particularly advantageous where first an integer motion vector is obtained in a first step, followed by a more accurate estimate around the integer motion vector using fractional pixels. Secondly, when performing the fractional pixel search, fractional pixel values are more closely packed in memory due to the absence of the integer position pixels.

Figure 8:
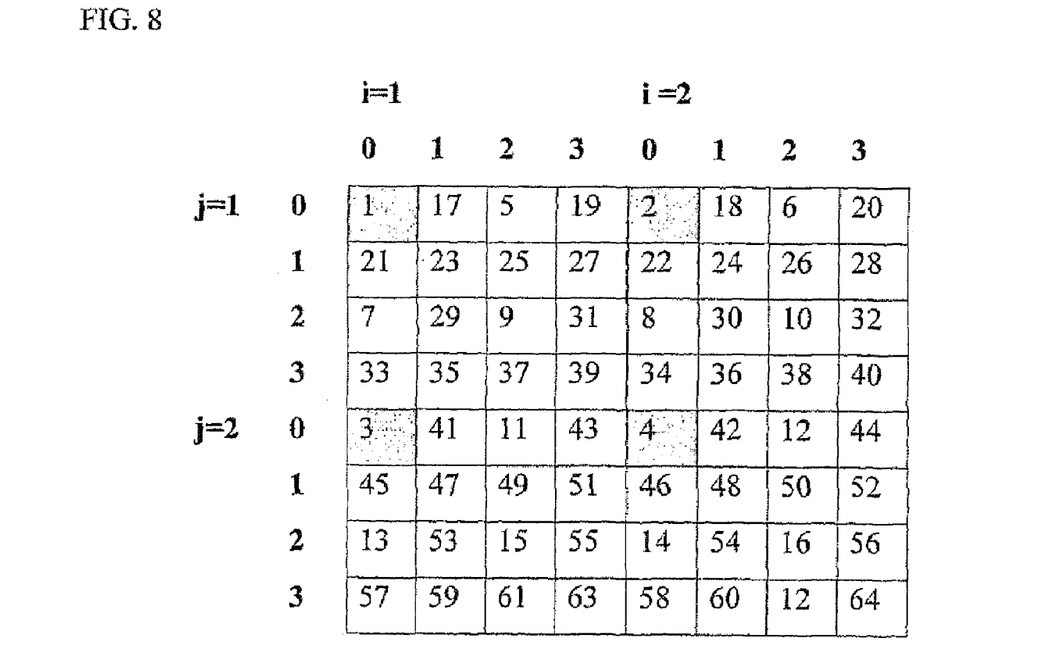
FIG. 8 is a representation of a fourth example of a storage arrangement according to the present invention

In a fourth embodiment the interpolated pixels of each fractional offset position are considered as a separate "picture" at the same resolution as $R_{00}(i,j)$, and are interleaved on a line by line basis. As in the third embodiment, the integer pixels $R_{00}(i,j)$ are stored separately. The three half-pixel previous pictures are interleaved with each other, and the twelve quarter-pixel previous pictures are interleaved with each other as follows.

```
for all j { for all i { R_00(i,j) } }
for all j
{
    for all i { R_20(i,j) }
    for all i { R_02(i,j) }
    for all i { R_22(i,j) }
}
for all j
{
    for all i { R_10(i,j) }
    for all i { R_30(i,j) }
    for all i { R_01(i,j) }
    for all i { R_11(i,j) }
    for all i { R_21(i,j) }
    for all i { R_31(i,j) }
    for all i { R_12(i,j) }
    for all i { R_32(i,j) }
    for all i { R_03(i,j) }
    for all i { R_13(i,j) }
    for all i { R_23(i,j) }
    for all i { R_33(i,j) }
}
```

This has benefits over the third embodiment when, as is the usual case, sub-pixel motion vector calculation is performed by firstly calculating a half-pixel motion vector from one of the eight surrounding the best integer motion vector and secondly, calculating a quarter-pixel motion vector from one of the eight surrounding the best half-pixel motion vector.

The invention claimed is:

1. A method of generating image data using a set of sampled pixels arranged along a plurality of lines, the method including:
   (i) at intermediate positions between sampled pixels, interpolating, using a processing system including at least one computer processor, the sampled pixels so as to provide at least one set of interpolated pixels, the or each set of interpolated pixels having a respective offset relative to the set of sampled pixels, and
   (ii) storing the or each set of interpolated pixels with a respective address in a memory, the addresses forming an ordered sequence, wherein along a given line, consecutive interpolated pixels having the same offset are stored with respective addresses that are consecutive to one another in the ordered sequence.

2. A method as claimed in claim 1, wherein the addresses of pixels from a plurality of lines and with a common offset are grouped together in the ordered sequence.

3. A method as claimed in claim 1, wherein the addresses of interpolated pixels on a given line are consecutive to one another in the ordered sequence, addresses of pixels having a common offset on the given line being grouped together.

4. A method as claimed in claim 1, wherein sampled pixels are grouped together along the ordered sequence.

5. A method as claimed in claim 1, wherein pixels are at least interpolated at half unit offsets and quarter unit offsets, the unit being determined by the spacing of the sampled pixels.

6. A method as claimed in claim 5, wherein addresses for pixels at half unit offset are grouped consecutively so as to form a first group, and wherein addresses for pixels at quarter unit offset are grouped consecutively so as to form a second group, the first and second groups neighbouring one another in the ordered sequence.

7. A method of generating a motion vector in respect of a reference frame relative to a target frame, the target frame being formed at least in part by image data generated as specified in claim 1.

8. A method of generating a motion vector as specified in claim 7, further including: selecting an image portion in the reference frame; and, comparing the selected portion with one or more portions of corresponding size in the target frame.

9. An apparatus for generating image data using a set of sampled pixels arranged along a plurality of lines, the apparatus including:
   a processor operable to interpolate the sampled pixels at intermediate positions therebetween so as to provide at least one set of interpolated pixels, the or each set of interpolated pixels having a respective offset relative to the sampled pixels; and
   a memory for storing the interpolated pixels, the processor being configured to store the or each set of interpolated pixels with a respective address in the memory, the addresses forming an ordered sequence, wherein along a given line, neighbouring interpolated pixels having the same offset are stored with respective addresses that are consecutive to one another in the ordered sequence.

10. The apparatus as claimed in claim 9, wherein the processor is configured, in response to a common instruction, to:
    retrieve a plurality of pixel values from a plurality of consecutively ordered addresses; and
    perform a computation on the retrieved pixel values.

11. The apparatus as claimed in claim 10, wherein the computation is a sum of absolute differences function.

* * * * *